United States Patent
Cheng et al.

(10) Patent No.: US 7,228,111 B2
(45) Date of Patent: Jun. 5, 2007

(54) KEYPAD STRUCTURE

(75) Inventors: Yung-Fa Cheng, Taipei (TW); Hsiang-Lung Kao, Taipei (TW); Kuo-Hsiang Wu, Taipei (TW)

(73) Assignee: Quanta Computer Inc., Taoyuan (TW)

( * ) Notice: Subject to any disclaimer, the term of this patent is extended or adjusted under 35 U.S.C. 154(b) by 580 days.

(21) Appl. No.: 10/266,401

(22) Filed: Oct. 8, 2002

(65) Prior Publication Data

US 2004/0203495 A1 Oct. 14, 2004

(30) Foreign Application Priority Data

Jun. 21, 2002 (TW) .............................. 91209366 U

(51) Int. Cl.
*H04B 1/38* (2006.01)
(52) U.S. Cl. ............... 455/90.3; 455/575.1; 455/575.3; 455/564; 455/666; 455/558; 455/418; 379/110.01; 379/433.01; 379/433.07
(58) Field of Classification Search ................ 455/566, 455/575.1, 564, 558, 575.3, 419, 90.1, 412.1, 455/90.3, 550.1, 575.4
See application file for complete search history.

(56) References Cited

U.S. PATENT DOCUMENTS

| | | | | |
|---|---|---|---|---|
| 6,148,075 A | * | 11/2000 | Inubushi et al. ............ | 379/368 |
| 6,166,627 A | * | 12/2000 | Reeley ................... | 340/426.25 |
| 6,217,183 B1 | * | 4/2001 | Shipman ...................... | 362/30 |
| 6,292,980 B1 | * | 9/2001 | Yi et al. ....................... | 16/303 |
| 6,310,609 B1 | * | 10/2001 | Morgenthaler .............. | 345/170 |
| 6,330,461 B1 | * | 12/2001 | Andersson .................. | 455/566 |
| 6,377,685 B1 | * | 4/2002 | Krishnan ............... | 379/433.07 |
| 6,377,811 B1 | * | 4/2002 | Sood et al. ................. | 455/464 |
| 6,418,323 B1 | * | 7/2002 | Bright et al. ............. | 455/550.1 |
| 6,463,262 B1 | * | 10/2002 | Johnson et al. ............ | 455/90.1 |
| 6,518,958 B1 | * | 2/2003 | Miyajima et al. ........... | 345/173 |
| 6,526,296 B1 | * | 2/2003 | Nieminen ................ | 455/575.3 |
| 6,563,927 B2 | * | 5/2003 | Mote et al. ............ | 379/433.11 |
| 6,680,676 B1 | * | 1/2004 | Hayashi et al. ................ | 341/22 |
| 6,728,558 B1 | * | 4/2004 | Kubo et al. .............. | 455/575.4 |
| 6,754,343 B2 | * | 6/2004 | Lundstrom et al. ......... | 379/446 |
| 6,785,565 B2 | * | 8/2004 | Gventer .................... | 455/575.4 |
| 6,842,626 B1 | * | 1/2005 | Kubo et al. .............. | 455/550.1 |
| 6,975,889 B2 | * | 12/2005 | Chen et al. .............. | 455/575.1 |

FOREIGN PATENT DOCUMENTS

TW 513024 6/1990

* cited by examiner

*Primary Examiner*—Marceau Milord
(74) *Attorney, Agent, or Firm*—Thomas, Kayden, Horstemeyer & Risley

(57) ABSTRACT

A keypad structure. A mobile phone has a casing and an elastic sheet. The casing includes a plurality of resilient cantilever arms and a plurality of protrusions formed on the plurality of resilient cantilever arms. The elastic sheet includes a plurality of keypad buttons to press the plurality of resilient cantilever arms.

20 Claims, 3 Drawing Sheets

KEYPAD STRUCTURE

BACKGROUND OF THE INVENTION

1. Field of the Invention

The present invention relates to a keypad structure. Particularly, the present invention relates to a keypad structure wherein the protrusions are disposed on the inner surface of the casing of the mobile phone.

2. Description of the Related Art

Mobile phones are popular and universal around the world. There has recently been a trend towards various colors for the appearances of the mobile phone. Conventionally, the casing of a mobile phone is manufactured in accordance with the following: A flat sheet is produced by injection molding, wherein the flat sheet has a colored pattern thereon. Then, the flat sheet is perforated by punching to obtain a casing for the mobile phone, wherein the casing is provided with holes for keypad buttons.

The casing is mounted on the mobile phone which has an elastic sheet inside. The elastic sheet includes a plurality of keypad buttons and protrusions on the bottoms of the keypad buttons. Three kinds of elastic sheets are provided by manufacturers: (1) an elastic sheet is made of rubber, wherein the keypad buttons and the protrusions are integrally formed (2) an elastic sheet is also made of rubber, but the keypad buttons and the protrusions of the elastic sheet are separately produced and then connected (3) the protrusions of the elastic sheet are made of rubber while the keypad buttons are made of different material stiffer than rubber (e.g. Taiwan Patent No. 457191). In operation, a key button of the elastic sheet is pressed so that the protrusion on the bottom of the key button pushes against a resilient metal piece on the printed circuit board of the mobile phone. When the key button is released, the protrusion on the bottom of the key button is restored via the elasticity. However, each conventional elastic sheet has problems of material fatigue after longtime operation, a limited structural design, and requires complex manufacturing processes and high manufacturing cost.

SUMMARY OF THE INVENTION

An object of the present invention is to provide an improved keypad structure that solves the above-mentioned problems.

The mobile phone of the present invention has a casing and an elastic sheet. The casing includes a plurality of resilient cantilever arms and a plurality of protrusions formed thereon respectively. The elastic sheet includes a plurality of keypad buttons to press the plurality of resilient cantilever arms.

It is noted that the protrusions are formed on the casing rather than the elastic sheet. Such an arrangement simplifies the structure of the elastic sheet so that a change of the design of the elastic sheet becomes easier. Furthermore, the casing can be manufactured by injection molding which provides low cost of manufacturing. In addition, the manufacturing process of the mobile phone is simplified.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
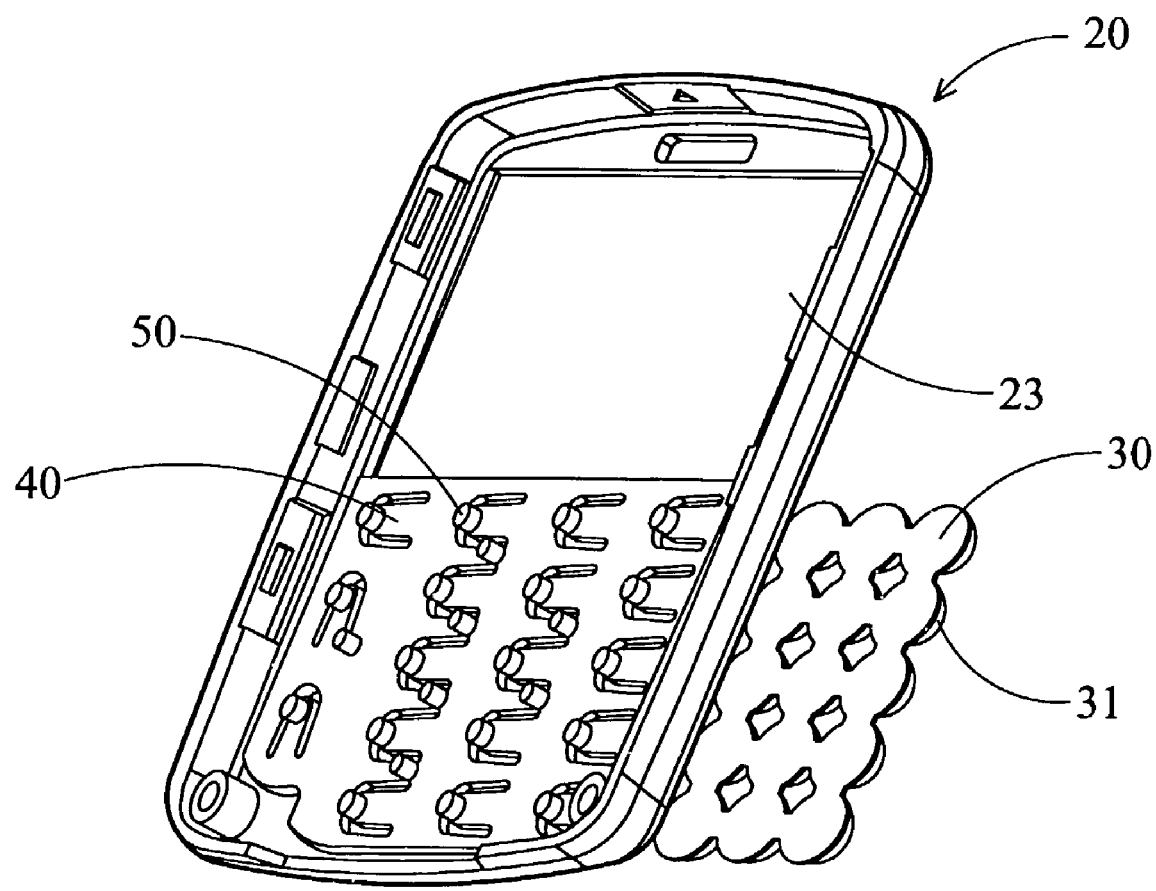
FIG. 1 is an exploded diagram of the shield and the elastic sheet of the mobile phone in accordance with the present invention, observed from the backs thereof.

Referring to FIG. 1, a mobile phone of the present invention includes a casing 20, perforated to form a plurality of resilient cantilever arms 40, and an elastic sheet 30 having a plurality of keypad buttons 31 thereon. The casing 20 is provided with a display window 23. The elastic sheet 30 is disposed on the casing 20, wherein the keypad buttons 31 of the elastic sheet 30 are positioned corresponding to the resilient cantilever arms 40 of the casing 20. Each resilient cantilever arm 40 has a protrusion 50 on its bottom surface for pressing a resilient metal piece (not shown) on the printed circuit board (also not shown) of the mobile phone. It is noted that the protrusion 50 is not pointed or sharp. Rather, the protrusion 50 is shaped like a cylindrical post (FIG. 1) or a dome (not shown), which has a flat or rounded contact surface with the resilient metal piece. This arrangement can avoid a cut of the protrusion 50 into the resilient metal piece, while the resilient metal piece is pressed by the protrusion 50 of the cantilever arm 40.

Figure 2:
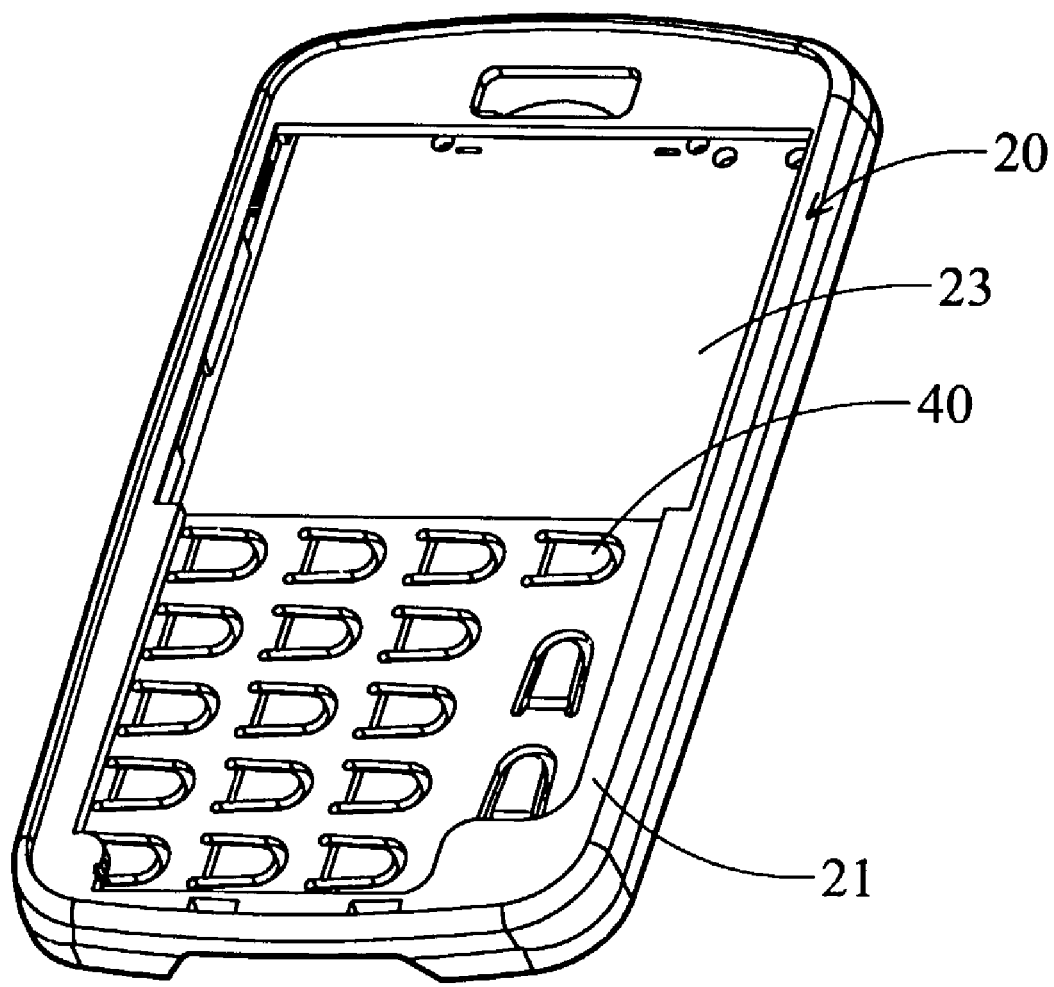
FIG. 2 is a perspective diagram of the shield of the mobile phone in accordance with the present invention, observed from the front thereof.

FIG. 2 is a perspective diagram of the casing of the mobile phone in accordance with the present invention, observed from the front thereof, wherein the casing 20 has a recessed portion 21 to accommodate the elastic sheet 30. The mobile phone of the present invention further includes a panel 22 (shown in FIG. 4) to cover and fix the elastic sheet 30 in the recessed portion 21.

Figure 3:
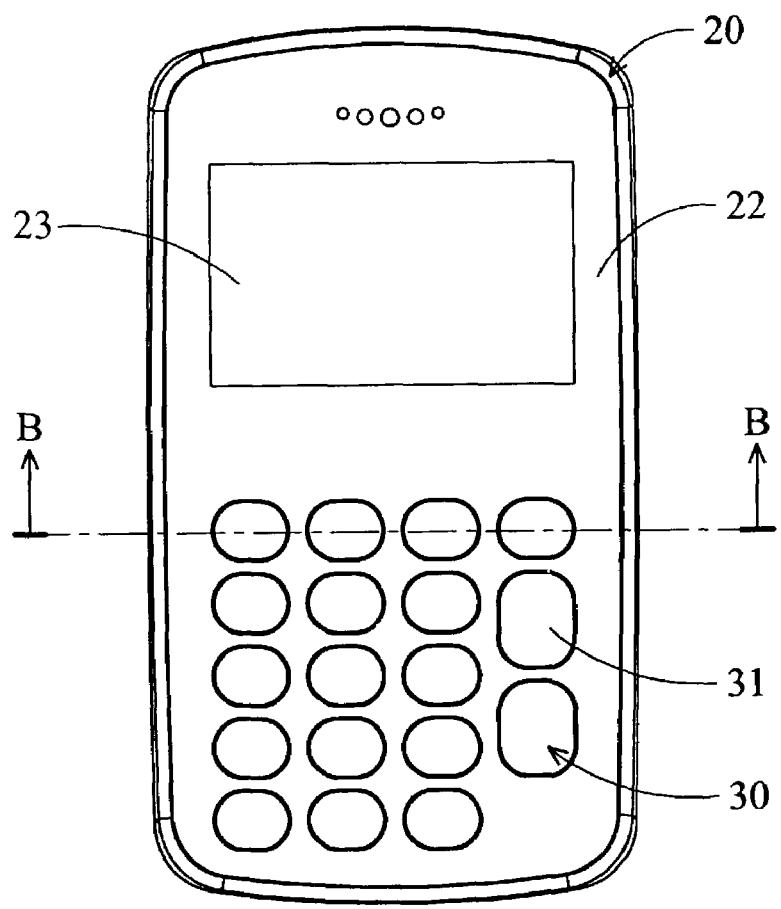
FIG. 3 is a front view of the mobile phone of the present invention, wherein the casing, the elastic sheet and the panel of the mobile phone are already assembled.
Figure 4:
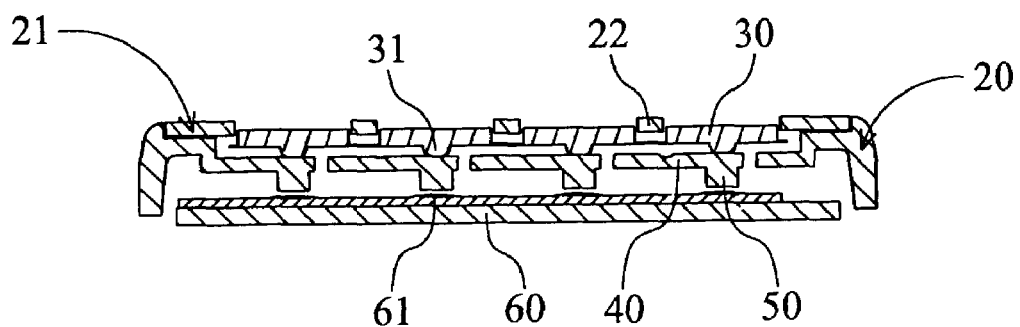
FIG. 4 is a sectional view of FIG. 3 along line B-B.

FIG. 3 is a front view of the mobile phone of the present invention, wherein the casing 20, the elastic sheet 30 and the panel 22 are already assembled, and FIG. 4 is a sectional view of FIG. 3 along line B-B. It is noted that the elastic sheet 30 of the present invention is thinner than the conventional one. Under the keypad buttons 31 are the resilient cantilever arms 40. The casing 20, the resilient cantilever arms 40 and the protrusions 50 are integrally formed, made of plastic and produced by injection molding. In operation, the key button 31 of the elastic sheet 30 is pressed so that the resilient cantilever arm 40 is bent, and the protrusion 50 on the bottom of the resilient cantilever arm 40 pushes against the resilient metal piece 61 on the printed circuit board 60 of the mobile phone. When the key button 31 of the elastic sheet 30 is released, the resilient cantilever arm 40 automatically returns to its original position.

In a modified embodiment, the panel 22 for covering and fixing the elastic sheet 30 in the recessed portion 21 is omitted. Then, the keypad buttons 31 of the elastic sheet 30 are correspondingly glued to the resilient cantilever arms 40 so that the elastic sheet 30 is fixed in the recessed portion 21 of the casing 20.

The present invention can also be adapted for portable devices such as a personal digital assistant, a portable computer, a digital camera or other electronic devices provided with keypad buttons.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus comprising:
   a casing including a plurality of resilient cantilever arms and a plurality of protrusions formed on the plurality of resilient cantilever arms; and
   an elastic sheet including a plurality of keypad buttons, the keypad buttons being arranged such that actuation of one of the keypad buttons presses a corresponding one of the plurality of resilient cantilever arms.

2. The apparatus as claimed in claim 1, wherein the casing is made of plastic.

3. The apparatus as claimed in claim 2, wherein the casing is an injection-molded product.

4. The apparatus as claimed in claim 1, further comprising a panel which covers the elastic sheet and fixes the elastic sheet and the casing together.

5. The apparatus as claimed in claim 4, wherein the casing further includes a recessed portion to accommodate the elastic sheet and the panel.

6. The apparatus as claimed in claim 1, wherein the plurality of keypad buttons are glued to the plurality of resilient cantilever arms.

7. The apparatus as claimed in claim 1, wherein the apparatus is a mobile phone.

8. The apparatus as claimed in claim 1 wherein the apparatus is a portable device.

9. The apparatus as claimed in claim 1, wherein the plurality of protrusions are dome-shaped.

10. The apparatus as claimed in claim 1, wherein the plurality of protrusions are cylindrical.

11. An apparatus comprising:
    a casing including a resilient cantilever arm and a protrusion, wherein the resilient cantilever arm has a first surface and a second surface opposite the first surface, and the protrusion is disposed on the first surface of the resilient cantilever arm; and
    an elastic sheet including at least one key button to press the second surface of the resilient cantilever arm.

12. The apparatus as claimed in claim 11, wherein the casing is made of plastic.

13. The apparatus as claimed in claim 12, wherein the casing is an injection-molded product.

14. The apparatus as claimed in claim 11, further comprising a panel which covers the elastic sheet and fixes the elastic sheet and the casing together.

15. The apparatus as claimed in claim 14, wherein the casing further includes a recessed portion to accommodate the elastic sheet and the panel.

16. The apparatus as claimed in claim 11, wherein the at least one key button is glued to the second surface of the resilient cantilever arm.

17. The apparatus as claimed in claim 11 wherein the apparatus is a mobile phone.

18. The apparatus as claimed in claim 11 wherein the apparatus is a portable device.

19. The apparatus as claimed in claim 11, wherein the protrusion is dome-shaped.

20. The apparatus as claimed in claim 11, wherein the protrusion is cylindrical.

* * * * *